Oct. 25, 1966   R. W. KUBERRY ETAL   3,281,662
AIR-COOLED TOWED MAGNETOMETER SENSOR
Filed Jan. 29, 1964

INVENTORS
RICHARD W. KUBERRY
ALBERT R. PRINCE
THOMAS J. SHOPPLE
BY
ATTORNEY

United States Patent Office 3,281,662
Patented Oct. 25, 1966

3,281,662
AIR-COOLED TOWED MAGNETOMETER SENSOR
Richard W. Kuberry, Corbin, Va., and Albert R. Prince, Warminster, and Thomas J. Shopple, Doylestown, Pa., assignors to the United States of America as represented by the Secretary of the Navy
Filed Jan. 29, 1964, Ser. No. 341,146
4 Claims. (Cl. 324—.5)

The invention herein described may be manufactured and used by or for the Government of the United States of America for governmental purposes without the payment of any royalties thereon or therefor.

The present invention relates in general to magnetometer sensors and more particularly to an airborne towed magnetometer sensor which is temperature stabilized during normal operation.

One technique for measuring the magnetic field strength of the earth over long traverses involves a magnetic detection system in which an atomic precession magnetometer sensor is housed in an aerodynamic vehicle and towed from an aircraft. The magnetometer sensor operates on an atomic precession principle in which a coil (or coils) is immersed in a proton-abundant fluid sample such as water or kerosene. A more detailed description of such a magnetometer sensor is described in U.S. Patent 3,004,-211 for Atomic Precession Magnetometers by Anderson et al., issued October 10, 1961.

It is customary in the prior art to totally enclose the sensor coil (or coils) in an outer container with the remaining space formed therein completely filled with the fluid sample. An inherent deficiency in such an arrangement results from heat generated by the combination of coil resistance and the polarizing current. At elevated temperatures, extraneous signals are present with the precession signal produced in the sensor coil by the protons so as to degrade readabality and to render the system useless for some purposes. In addition, an internal fluid sample pressure may occur which causes rupture of the container. This latter event is particularly hazardous when highly volatile hydrocarbons such as hexane are used in the proton fluid sample. Several techniques of preventing elevated coil temperatures have been employed with little or no success, but they usually added considerably to unit costs, increased unit weight and size, multiplied the incidence of fluid sample leakage, introduced magnetic inclusions, or generally degraded the sensor sensitivity.

Accordingly, it is an object of the present invention to provide a novel arrangement of an atomic precession magnetometer sensor and towed vehicle combination in which heat generated by the sensing coils is efficiently and quickly dissipated during normal functioning of the apparatus, in which the magnetometer sensor sensitivity and the aerodynamic stability of the vehicle are not degraded, and in which the natural airflow at the towed vehicle is substantially in direct contact with the sensing coils.

Another object of the invention is to provide an improved airborne magnetometer sensor of the type employing atomic precession in which the proton-abundant fluid sample is separately contained to facilitate changing of fluid samples in the sensing coils, in which the possibility of the fluid sample spilling or leaking is minimized, and in which separate handling and storing of the fluid samples is facilitated.

Still another object of the invention is to provide an improved air-cooled magnetometer sensor which occupies a minimum of space, which comprises relatively few parts, which is simple and inexpensive to manufacture, and which is especially suitable for use in airborne towed vehicles.

Various other objects and advantages will appear from the following description of one embodiment of the invention, and the most novel features will be particularly pointed out hereinafter in connection with the appended claims.

Figures 1, 2, 3:
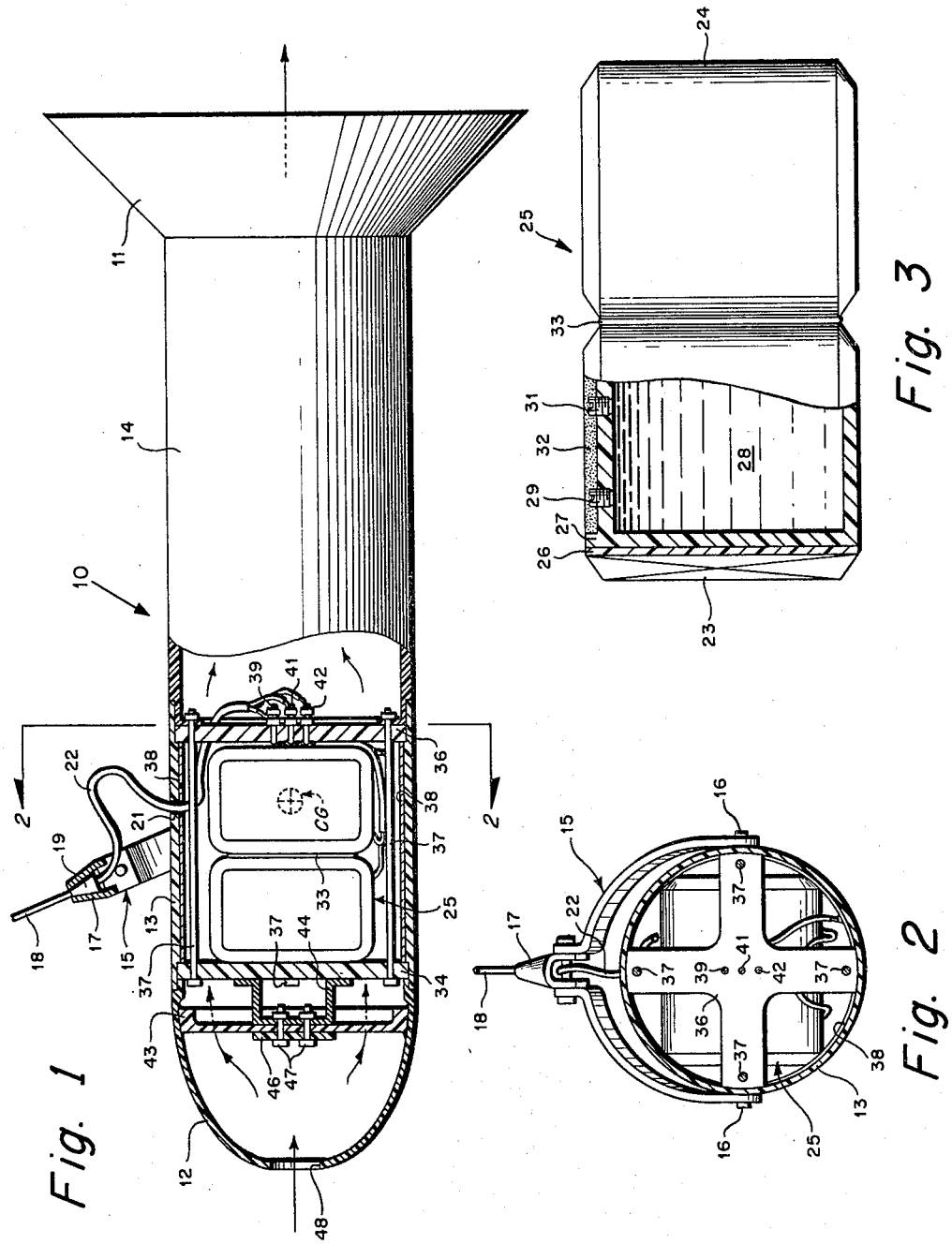
FIG. 1 represents a longitudinal view of an airborne towed vehicle of the present invention with the forward portion thereof cut away to show an atomic precession magnetometer sensor mounted therein.
FIG. 2 represents a transverse cross section of the towed vehicle as taken along the line 2—2 of FIG. 1.
FIG. 3 represents a partially cut away longitudinal view of the magnetometer sensor as viewed from the top of FIG. 1.

In the illustrated embodiment of the invention, an airborne towed vehicle, indicated generally by the numeral 10 in FIG. 1, is shown having a general ballistic profile terminating in a flared drag skirt 11 for added aerodynamic stability. The ballistic profile of the vehicle 10 is formed from front to rear by a streamlined hollow nose section 12, a hollow cylindrical middle section 13 and a rearward section 14, respectively. It is contemplated that the vehicle 10 and its appurtenances be constructed of non-magnetic materials, such as aluminum, plastics or the like, in order that the ambient magnetic fields to be measured are not disturbed. The particular non-magnetic materials selected do not form an essential part of this invention so long as they are consistent with good design practice. The sections 12, 13 and 14 are coaxially arranged in tandem and interlocked at their confronting edges in a manner described hereinafter whereby a smooth, continuous surface is maintained along the length of the ballistic profile. The vehicle 10 is towed from an aircraft by a cable 18 which is connected to the vehicle 10 by a bridle assembly 15. The bridle assembly 15 includes bifurcated ends which are pivotally connected at studs 16 extending from opposite sides of the middle section 13 on a transverse axis passing through the CG (center of gravity) of the vehicle 10. The bridle 15 further includes a tapered socket 17 pivotally connected intermediate of the bifurcated ends for passing the tow cable 18 therethrough. The cable 18 comprises three electrical conductors and one strain element running the full length thereof except that the strain element terminates in a tapered wedge 19 about the cable 18 for mating with the socket 17. The vehicle loading is thus transferred to the aircraft through the bridle 15 and the strain element of the cable 18. The three electrical conductors in the cable 18 continue from the wedge 19 into the vehicle 10 through an opening 21 at the top of the middle section 13. A loop is placed in a portion 22 of the cable 18 to insure sufficient slack pivoting of the bridle 15 about the studs 16.

For operation in the manner generally described in U.S. Patent No. 3,004,211, supra, the magnetometer sensor, indicated generally by the numeral 25, includes two sensor coils 23 and 24 placed side by side and electrically connected in series so that the magnetic field forces generated thereby are in opposite directions. As best seen in the top view of FIG. 3, coils 23 and 24 are each wound about a rigid sleeve 26 open at both ends and having a generally rectangular configuration as viewed from either end. The coils 23 and 24 are coated with an electrically nonconductive material such as an epoxy and are secured together at their confronting flat surfaces in the side-by-side arrangement by an appropriate bonding material 33. A container 27, removably inserted into each sleeve 26 of the coils 23 and 24, contains a proton-abundant fluid sample 28 such as water or hexane. One end of the container 27 is provided with two threaded plugs 29 and 31 for filling and draining the fluid sample 28. The same end is also slightly recessed for applying a sealant 32 to insure against the leaking at the plugs 29 and 31.

The magnetometer sensor 25 is proportioned so that all of the longitudinally disposed edges of the coils 23 and 24 are substantially in sliding contact with the inner surface of the middle section 13. The sensor 25 is restrained from longitudinal movement along the vehicle axis by two cross-shaped members 34 and 36 whose extremities abut inner portions of the middle section 13 near each end. The inner portions of members 34 and 36 are urged against the exposed ends of the coils 23 and 24 by four bolts 37 connected between corresponding extremities of the members 34 and 36.

In order to reduce the effects of RF energy at the sensor 25, the inner surface of the middle section 13 is lined with an electrically conductive liner 38 which is electrically connected through a terminal 39 on the member 36 to one of the three conductors in the cable 18. The other two conductors in the cable 18 are electrically connected to the coils 23 and 24 through terminals 41 and 42 on the member 36.

The nose section 12 is secured to the middle section 13 by an elongated rib member 43 fixed at its ends to the inner surface of the nose section 12 at diametrically opposite sides thereof. A standoff bracket 44, fixed to the cross-shaped member 34, facilitates attachment of the rib member 43 with a bushing 46 and bolts 47. When the bolts 47 are fully secured, the nose section 12 is positively interlocked with the middle section 13. An opening 48 at the front of the nose section 12 provides both an access for tightening the bolts 47 and for admitting air. During flight relatively cold air enters the opening 48 and flows at relatively high velocity through the sections 12, 13 and 14 to an opening in the rear where it exits. In passing through the middle section 13, the air comes in direct contact with the magnetometer sensor coils 23 and 24 thereby providing a cooling effect. The air passage through the nose and mid sections 12 and 13 is somewhat tortuous such that the high velocity air is turbulent and "scrubs" the coils 23 and 24 thereby increasing the heat dissipating efficiency.

Some of the many advantages of the present invention should now be apparent. For example, the magnetometer sensor 25 is now maintained at ambient temperature during flight without danger of overheating; only a small portion of the surrounding air enters through the opening 48 so that the aerodynamic stability of the towed vehicle is not disturbed; and the structural configuration of the overall system has been greatly simplified. The magnetometer sensor per se has also been greatly improved by its capability of having readily removable fluid containers permitting the proton fluid sample to be changed or stored independently of the sensor coils and towed vehicle.

It will be understood, of course, that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. An airborne magnetometer sensor apparatus for towing from an aircraft comprising, in combination:
   a cylindrical housing having a ballistic profile terminating in a flared drag skirt, said housing having a relatively small opening in the nose portion thereof and a relatively large opening in the rear portion thereof for passing air therethrough forming therein an air flow path when the housing is towed;
   a tow cable adapted to be connected to the aircraft, said cable including a strain element and electrical conductor means running substantially the entire length thereof;
   a bridle adapted to be connected to said tow cable and pivotally connected at the center of gravity of said apparatus;
   a magnetometer sensor secured within said housing intermediate the ends thereof, said sensor including:
      two substantially identical hollow containers each externally formed into a generally rectangular parallelepiped and defining two end and four side surfaces;
      a proton-abundant fluid enclosed in each of said containers;
      two coils each uniformly wound and removably mounted about said side surfaces between said end surfaces of said container and disposed within said air flow path;
      said coils being positioned side-by-side with their confronting sides fixed and forming thereby four longitudinal edges at the ends of said coils in slidable contact with the inner surface of said housing and having portions thereof spaced from said housing permitting communication immediately adjacent said coils in said air flow path between said small and large openings; and
      said coils being electrically connected in series-bucking manner with electrical terminals connected to said conductor means; and
   a radio frequency shield lined about the inside of said housing adjacent to said sensor;
   whereby air entering said relatively small opening passes in substantially direct contact with said coils thereby maintaining said sensor at a normal operating temperature.

2. An airborne magnetometer sensor apparatus for towing from an aircraft comprising, in combination:
   a cylindrical housing having a ballistic profile terminating in a flared drag skirt, said housing having a relatively small opening in the nose portion thereof and a relatively large opening in the rear portion thereof for passing air therethrough forming therein an air flow path when the housing is towed;
   a tow cable adapted to be connected to the aircraft, said cable including a strain element and electrical conductor means running substantially the entire length thereof;
   a bridle adapted to be connected to said tow cable and pivotally connected at the center of gravity of said apparatus; and
   a magnetometer sensor secured within said housing intermediate the ends thereof, said sensor including:
      two substantially identical hollow containers each externally formed into a generally rectangular parallelpiped and defining two end and four side surfaces;
      a proton-abundant fluid in each of said containers;
      a uniformly wound coil removably mounted about said side surfaces between said end surfaces of each of said containers and disposed within the said air flow path;
      each of said coils being secured to the other in side-by-side relationship forming thereby four longitudinal edges in slidable contact with the inner surfaces of said housing and having portions thereof spaced from said housing permitting communication immediately adjacent said coils in said air flow path between said small and large openings; and
      said coils being electrically connected in series-bucking manner and having electrical terminals connected to said conductor means;
   whereby air entering said relatively small opening comes into substantially direct contact with said coils and thereby maintains said sensor at a normal operating temperature.

3. An airborne magnetometer sensor apparatus comprising, in combination:
   a cylindrical housing having a ballistic profile, said housing having an opening in the nose portion thereof and a relatively large opening in the rear portion thereof for passing air therethrough forming therein an air flow path between said nose cone and said rear opening when said housing is towed;

a bridle adapted to be connected to a tow cable and pivotally connected to said apparatus; and a magnetometer sensor secured within said housing intermediate the ends thereof, said sensor including:

two substantially identical hollow containers each externally formed into a generally rectangular parallelepiped and defining two end and four side surfaces;

a proton-abundant fluid enclosed in each of said containers;

two coils each uniformly wound and removably mounted about said side surfaces between said end surfaces of each of said containers and disposed within said air flow path;

said coils being positioned side-by-side with their confronting sides fixed and forming thereby four longitudinal edges at the ends of said coils in slidable contact with the inner surface of said housing and having portions thereof spaced from said housing permitting communication immediately adjacent said coils in said air flow path between said nose opening and said rear opening; and said coils being electrically connected in series-bucking manner.

4. An airborne magnetometer sensor apparatus comprising, in combination:

a cylindrical housing having a ballistic profile, adapted to be towed from an aircraft, said housing having an opening in the nose portion thereof and a relatively large opening in the rear portion thereof for passing air therethrough forming therein an air flow path between said nose opening and said rear opening; and a magnetometer sensor secured within said housing intermediate the ends thereof, said sensor including:

two hollow container means externally formed into a generally rectangular parallelepiped and defining two end and four side surfaces;

two sensor coil means each removably mounted about said side surfaces between said end surfaces of respective container means;

said coil means being positioned within and partially obstructing said air flow path;

said coil means having longitudinal edges at the ends of said coil means, positioned for slidable contact with the inner surface of said housing and having portions thereof spaced from said housing permitting communication immediately adjacent said coil means in said air flow path between said nose opening and said rear opening; and a proton-abundant fluid in said container means.

References Cited by the Examiner

UNITED STATES PATENTS

| | | | |
|---|---|---|---|
| 2,501,898 | 3/1950 | Haggerty | 62—241 |
| 3,105,934 | 10/1963 | Barringer | 324—4 |
| 3,131,345 | 4/1964 | Abragam et al. | 324—.5 |
| 3,166,707 | 1/1965 | Bonnet et al. | 324—.5 |
| 3,173,081 | 3/1965 | Barringer | 324—.5 |

FOREIGN PATENTS

| | | |
|---|---|---|
| 510,539 | 9/1920 | France. |
| 777,402 | 6/1957 | Great Britain. |

WALTER L. CARLSON, *Primary Examiner.*

MAYNARD R. WILBUR, LEWIS H. MEYERS,
*Examiners.*

A. E. RICHMOND, *Assistant Examiner.*